United States Patent
Houzel

(10) Patent No.: US 7,123,603 B2
(45) Date of Patent: Oct. 17, 2006

(54) METHOD OF ESTABLISHING A RADIO LINK BETWEEN AN ACCESS CONTROLLER AND A BASE STATION

(75) Inventor: Bertrand Houzel, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 988 days.

(21) Appl. No.: 09/978,100

(22) Filed: Oct. 17, 2001

(65) Prior Publication Data

US 2002/0051440 A1    May 2, 2002

(30) Foreign Application Priority Data

Oct. 30, 2000    (FR) .................................. 00 13967

(51) Int. Cl.
*H04Q 7/24* (2006.01)
(52) U.S. Cl. ...................................... 370/338; 370/469
(58) Field of Classification Search ........... 370/310.01, 370/469, 338, 329, 349, 393, 389, 470, 471
See application file for complete search history.

(56) References Cited

U.S. PATENT DOCUMENTS

| | | | | |
|---|---|---|---|---|
| 6,084,880 A * | 7/2000 | Bailey et al. | ............ | 370/395.2 |
| 6,456,631 B1 * | 9/2002 | Nomura | ............ | 370/466 |
| 6,507,567 B1 * | 1/2003 | Willars | ............ | 370/321 |
| 6,519,461 B1 * | 2/2003 | Andersson et al. | ............ | 455/453 |
| 6,643,813 B1 * | 11/2003 | Johansson et al. | ............ | 714/748 |
| 6,668,170 B1 * | 12/2003 | Costa et al. | ............ | 455/439 |
| 6,725,038 B1 * | 4/2004 | Subbiah | ............ | 455/436 |
| 6,728,365 B1 * | 4/2004 | Li et al. | ............ | 379/329 |
| 6,738,634 B1 * | 5/2004 | Shin | ............ | 455/466 |
| 6,804,202 B1 * | 10/2004 | Hwang | ............ | 370/282 |
| 6,823,193 B1 * | 11/2004 | Persson et al. | ............ | 455/522 |
| 6,879,566 B1 * | 4/2005 | Raivio et al. | ............ | 370/310.1 |
| 2001/0053145 A1 * | 12/2001 | Willars et al. | ............ | 370/352 |

FOREIGN PATENT DOCUMENTS

WO    WO 00/44191    7/2000

OTHER PUBLICATIONS

3G TS 25.433 V1.02. (Jun. 1999), "3GPP:TSG RAN NBAP Specification", pp. cover, 17, 18, 24, & 25.*
3G TS25.433 V3.1.0 (Jun. 2000), 3GPP:TSG RAN UTRAN Iub Interface NBAP Signaling (Release 1999), pp. cover, 40, & 41.*
Matti Turunen, Nokia, pp. 1-45, XP-002176895, "UMTS Protocol Functionalities (Cont.)", 1999.

* cited by examiner

*Primary Examiner*—Chau Nguyen
*Assistant Examiner*—Jung Park
(74) *Attorney, Agent, or Firm*—Oblon, Spivak, McClelland, Maier & Neustadt, P.C.

(57) ABSTRACT

Method of establishing a radio link at the interface between a base station and an access network controller in a mobile telecommunication network including forming a request message for establishing the link by concatenating a message of the control protocol of the radio link and a plurality of messages of the transport protocol on the link; transmitting the request message by the access controller to the base station; and receiving a response message sent back by the station.

16 Claims, 4 Drawing Sheets

METHOD OF ESTABLISHING A RADIO LINK BETWEEN AN ACCESS CONTROLLER AND A BASE STATION

CROSS REFERENCE TO RELATED APPLICATIONS

This application is based upon and claims priority under 35 U.S.C. §119 from French Patent Application No. 0013967, filed Oct. 30, 2000.

BACKGROUND OF THE INVENTION

The present invention concerns in general terms a method of establishing a radio link in a mobile radio telecommunication network. More precisely, the invention concerns a method of establishing a radio link between an access network controller (RNC) and a base station (B node) of the UMTS network.

FIG. 1 depicts highly schematically the access network in the context of UMTS, known as UTRAN (standing for UMTS Terrestrial Radio Access Network). The access network provides the link between the mobile terminal of the user (UE, standing for User Equipment) and the interconnection network (CN, standing for Core Network). It has access network controllers (RNC, standing for Radio Network Controller) and base stations (B nodes), each RNC controller being able to control a plurality of B nodes. The interface between a B node and the RNC which controls it is referred to as the $I_{ub}$ interface.

The RNC controller is responsible for managing the radio resources and controlling the handover. For this purpose, the RNC controller establishes or releases AAL2 connections to the $I_{ub}$ interface. When a mobile terminal is in a soft-handover situation, it communicates simultaneously with several base stations, these base stations being able to be controlled by the same RNC controller or different controllers. When the mobile terminal moves, it is therefore necessary to create new AAL2 connections and to release others, and this rapidly, so as not to create an interruption for the user.

FIG. 2 depicts the different protocol planes used on the $I_{ub}$ interface, as specified by the 3GPP working group on the UTRAN access network. The $I_{ub}$ interface has recourse to two distinct protocol layers: a transport layer (I) and a layer related to the radio functions (II).

The first protocol plane (RNCP standing for Radio Network Control Plane) concerns the transportation of UMTS control messages. It includes the NBAP (standing for Node B Application Part) application protocol for negotiating radio resources between the B node and the RNC controller in order to support the communications of the users. The messages of this protocol are transmitted over the ATM link via adaptation layers.

The second protocol plane (TNCP standing for Transport Network Control Plane) concerns the transportation of the control messages of the transport layer. It comprises the ALCAP (Access Link Control Application Part) protocol providing independence between the control plane (RNCP) and the user plane. The messages of the ALCAP protocol are transmitted on the ATM layer via adaptation layers.

The third protocol plane (UP standing for User Plane) concerns the user traffic flows. It comprises logic channels (LCH), common or dedicated, and an AAL2 layer providing the adaptation to the ATM layer.

FIG. 3 depicts schematically the procedure for establishing a radio link. The NBAP protocol layer of the RNC initiates the procedure by transmitting a request (NBAP: RL Set-up Request) specifying the number of AAL2 connections to be established on the $I_{ub}$ interface. The base station (B node) responds in return by means of a response message (NBAP: RL Set-up Response) supplying to the controller an ATM connection identifier. The content of the messages RL Set-up Request and RL Set-up Response is described in the document 3GTS25.433 from the 3GPP Special Working Group on the Radio Access Network entitled "UTRAN $I_{ub}$ Interface NBAP Signalling".

The ALCAP protocol layer of the RNC next generates AAL2 connection requests equal in number to the number required by the NBAP layer. More precisely, each of the requests (Q.AAL2(ALCAP): ERQ) is transmitted by the RNC in accordance with Q.2630.1 signalling, also referred to as Q.AAL2, and gives rise to a corresponding confirmation (Q.AAL2(ALCAP): ECF) on the part of the base station, each confirmation including the identifier for the connection.

The procedure for establishing a radio link between a base station and an RNC controller is therefore relatively cumbersome since it requires the intervention of two protocol levels (NBAP and ALCAP) and the exchange of 2(N+1) messages, where N is the number of AAL2 connections to be established to support the said link. However, as has been seen, this establishment procedure must be rapid.

SUMMARY OF THE INVENTION

The aim of the present invention is to simplify the procedure for establishing a radio link on the $I_{ub}$ interface.

The aim of the invention is to reduce the number of messages exchanged between the RNC controller and the base station for establishing the said link.

To this end, the method according to the invention is defined by the establishment of a radio link at the interface between a base station ($I_{ub}$) and an access network controller (RNC) in a mobile telecommunication network, comprising the transmission by the access controller of a message requesting the establishment of the said link to the base station and the reception of a response message sent back by the said station, the said request message being formed by the concatenation of a message from the control protocol of the said radio link (NBAP) and a plurality of messages from the transport control protocol (ALCAP) on the said link.

According to a variant, the request message comprises the number of messages of the said transport control protocol.

Advantageously, the said response message is formed by the concatenation of a message of the said radio link control protocol and a plurality of messages of the said transport control protocol.

According to a preferred application, the mobile telecommunication network being the UMTS network and the said interface being the $I_{ub}$ interface of the said network, the radio link control protocol is the NBAP protocol and the transport control protocol is the ALCAP protocol.

Typically, the messages of the ALCAP protocol comprised in the request messages are AAL2 connection request messages.

In this case, the messages of the ALCAP protocol comprised in the response message are AAL2 connection confirmation messages.

BRIEF DESCRIPTION OF THE DRAWINGS

The characteristics of the invention mentioned above, as well as others, will emerge more clearly from a reading of the description given in relation to the accompanying drawings, amongst which.

DETAILED DESCRIPTION OF THE INVENTION

The general idea at the basis of the invention is to concatenate on the one hand the request messages of the RNC controller and on the other hand the response messages of the base station. The establishment request (NBAP: RL Set-up Request) and the corresponding response (NBAP: RL Set-up Response) are respectively encapsulated in the concatenated request message and the concatenated response message, so that a single protocol level acts in the procedure.

Figure 1:
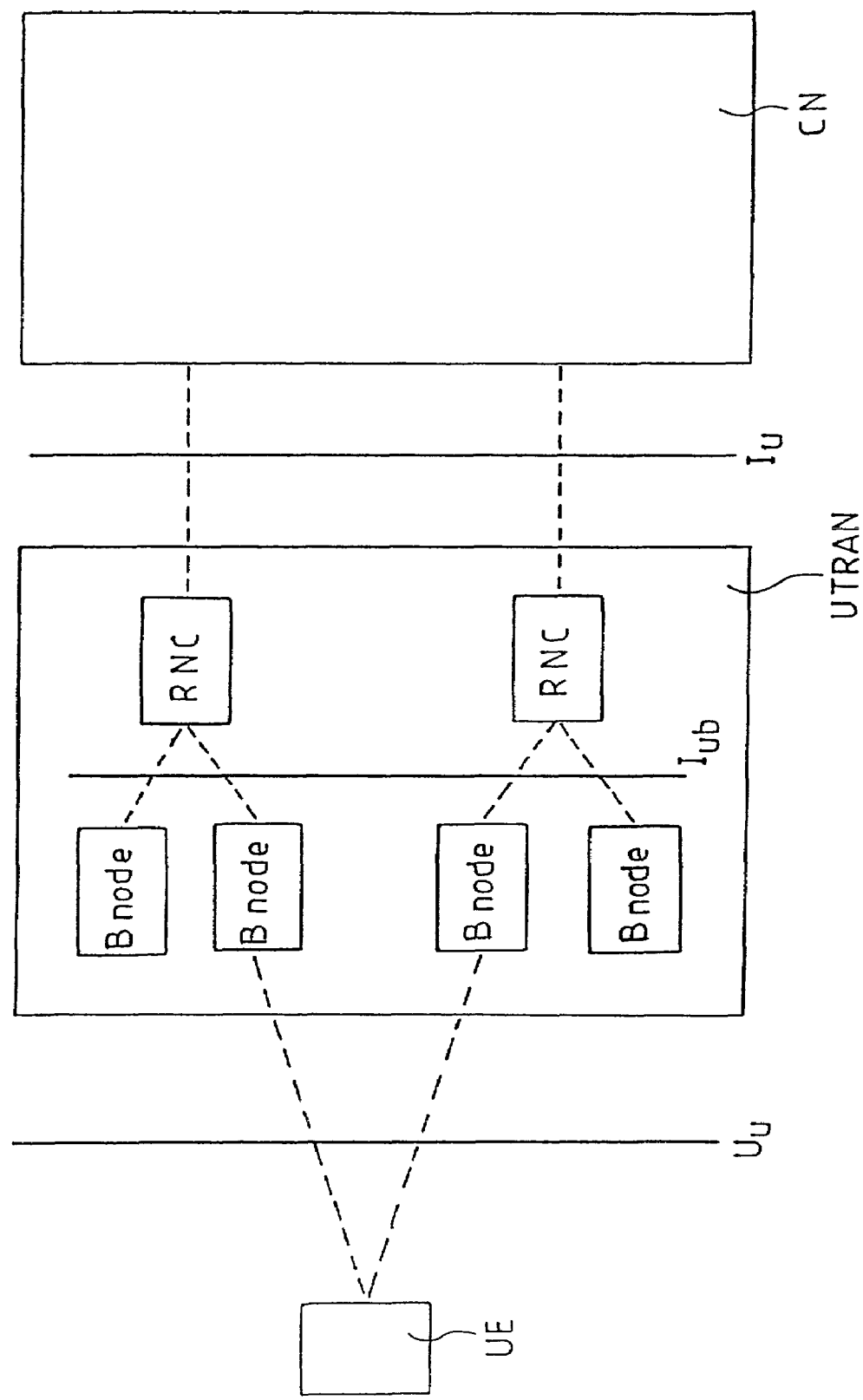
FIG. 1 depicts schematically the access network in the context of the UMTS.
Figure 2:
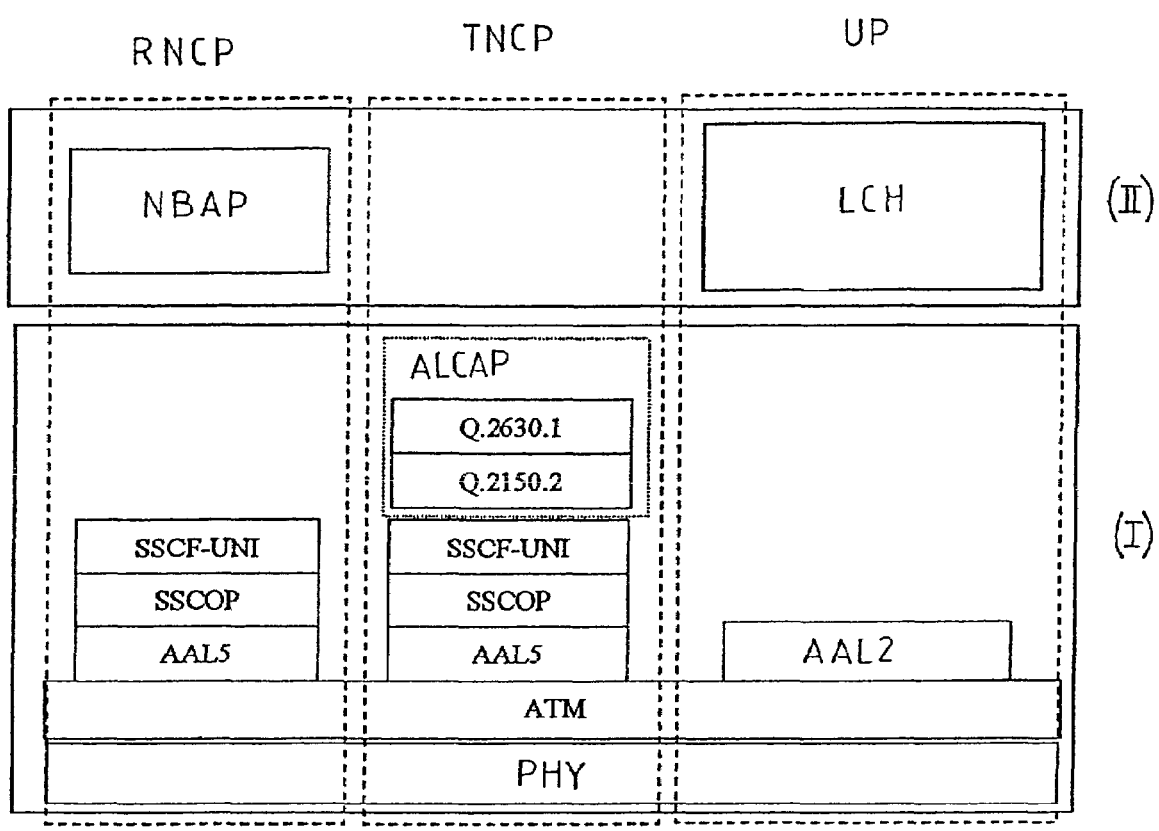
FIG. 2 depicts schematically the protocol planes used on the $I_{ub}$ interface.
Figure 3:
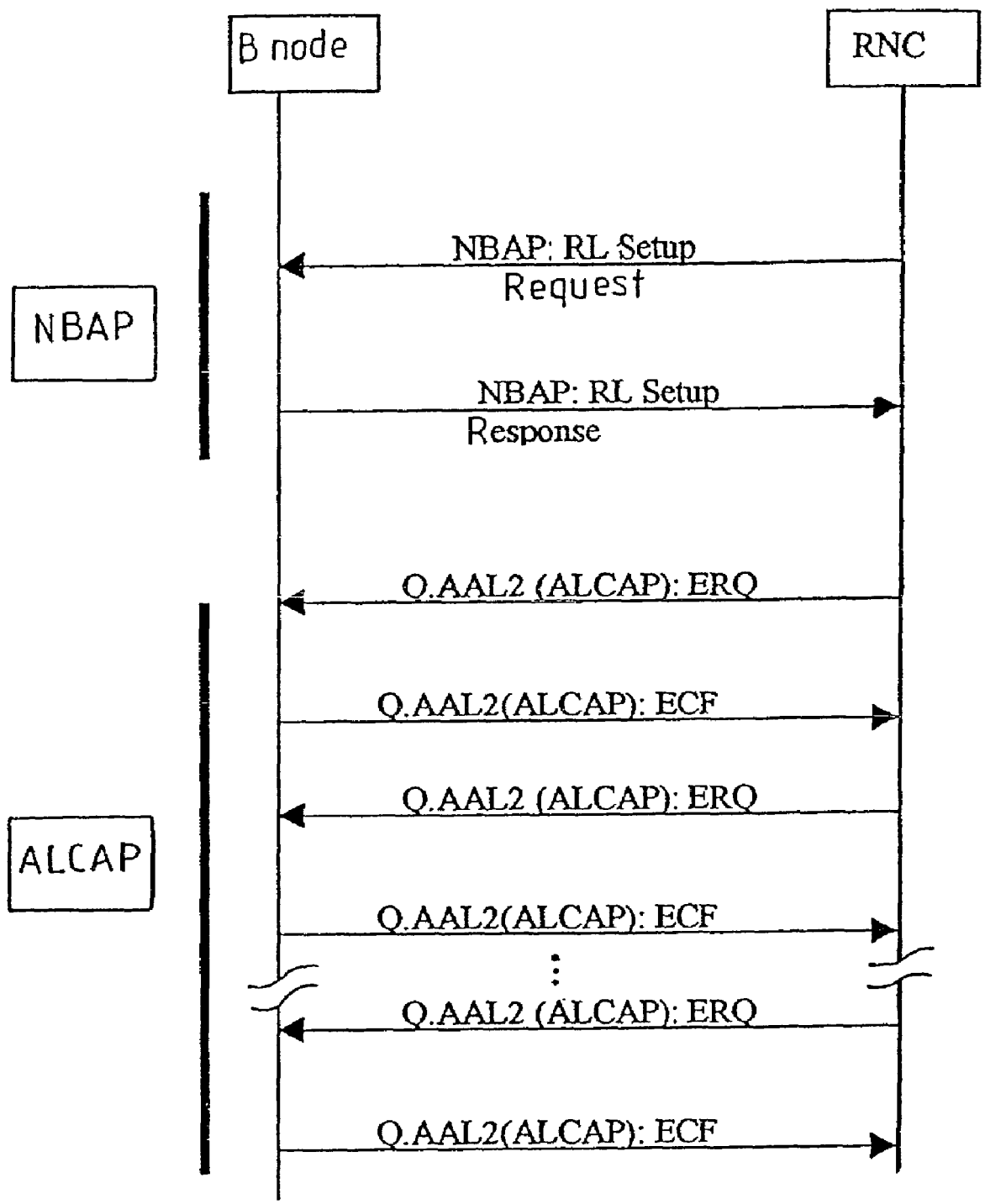
FIG. 3 depicts schematically the message exchange on the $I_{ub}$ interface for establishing a radio link.
Figure 4:
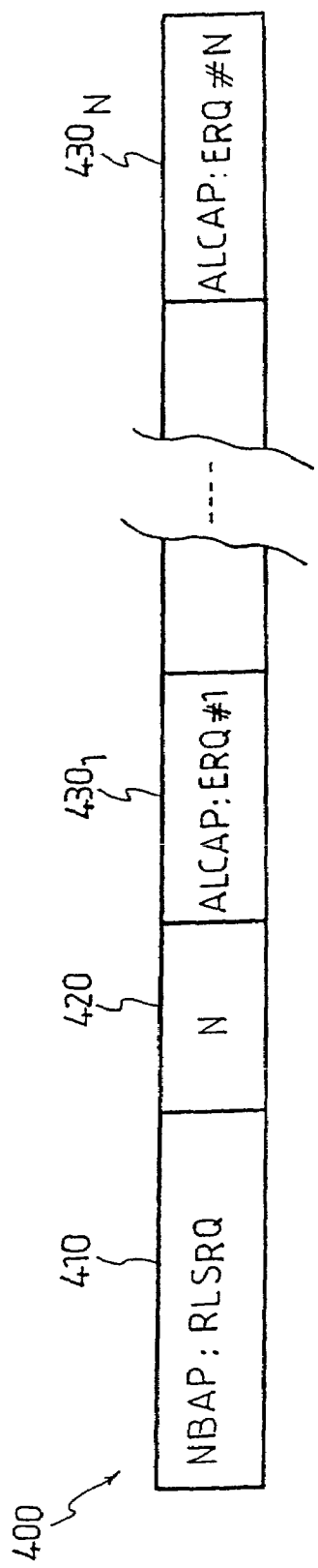
FIG. 4 depicts a request message format used in the method according to the invention.

The concatenated request message format is illustrated in FIG. 4.

The message (400) sent by the RNC controller comprises at (410) the radio link establishment request of the NBAP protocol, that is to say (NBAP: RL Set-up Request), at (420) the number (N) of AAL2 connection requests for supporting the said link and at (430$_1$), (430$_2$), . . . (430$_N$) the N AAL2 connection request messages, that is to say Q.AAL2 (AL-CAP):ERQ#1, Q.AAL2 (ALCAP):ERQ#2, . . . ,Q.AAL2 (ALCAP):ERQ#N.

Figure 5:
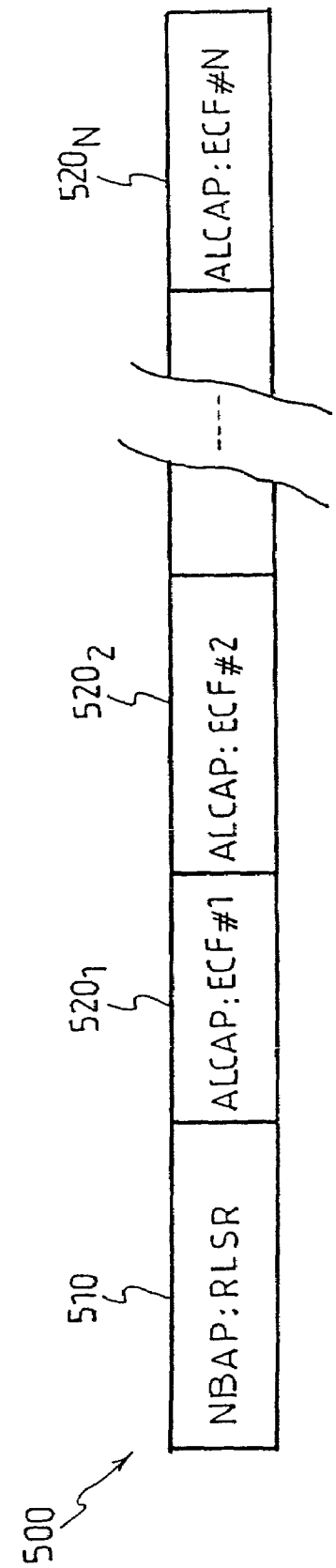
FIG. 5 depicts a response message format used in the method according to the invention.

The concatenated response message format is illustrated in FIG. 5.

The message (500) sent by the base station comprises at (510) the response message (NBAP: RL Set-up response) as well as, at (520$_1$), (520$_2$), . . . (520$_N$), the N AAL2 connection confirmation messages, that is to say Q.AAL2 (AL-CAP):ECF#1, Q.AAL2 (ALCAP):ECF#2, . . . , Q.AAL2 (ALCAP):ECF#N.

The radio link establishment procedure then consists of the sending of a concatenated request message by the ACALP layer of the RNC controller. This message is decomposed by the base station into elementary NBAP messages: RL Set-up Request, AAL2(ALCAP):ERQ#1, Q.AAL2(ALCAP):ERQ#2, . . . , Q.AAL2(ALCAP): ERQ#N.

The latter then sends the NBAP response message: RL Set-up Response and connection confirmation message Q.AAL2 (ALCAP):ECF#1, Q.AAL2 (ALCAP): ECF#2, . . . , Q.AAL2 (ALCAP):ECF#N in the form of a concatenated message.

The invention claimed is:

1. A method of establishing a radio link at the interface between a base station and an access network controller in a mobile telecommunication network, comprising:
    forming a request message for establishing the link by concatenating a message of the radio link control protocol and a plurality of connection request messages of the transport control protocol on the link;
    transmitting the request message by the access controller to the base station; and
    receiving the response message sent back by the station, wherein the radio link control protocol is the NBAP protocol and the transport control protocol is the ALCAP protocol.

2. The radio link establishment method according to claim 1, wherein forming the request message includes forming the request message with the number of connection request messages of the transport control protocol.

3. The radio link establishment method according to claim 1, further comprising forming a response message by concatenating a message of the radio link control protocol and a plurality of messages of the transport control protocol.

4. The radio link establishment method according to claim 3, wherein the mobile telecommunication network being the UMTS network and the interface being the Iub interface of the network.

5. The radio link establishment method according to claim 4, wherein forming the request message includes forming the request message with ALCAP protocol messages that are AAL2 connection request messages.

6. The radio link establishment method according to claim 4, wherein forming the response message includes forming the response message with ALCAP protocol messages that are AAL2 connection confirmation messages.

7. A method of establishing a radio link at the interface between a base station and an access network controller in a mobile telecommunication network, comprising:
    forming a request message for establishing the link by concatenating a message of the radio link control protocol, a plurality of messages of the transport control protocol, and a number of the plurality of messages of the transport control protocol;
    transmitting the request message by the access controller to the base station; and
    receiving the response message sent back by the station, wherein the radio link control protocol is the NBAP protocol and the transport control protocol is the ALCAP protocol.

8. The radio link establishment method according to claim 7, further comprising forming a response message by concatenating a message of the radio link control protocol and a plurality of messages of the transport control protocol.

9. The radio link establishment method according to claim 8, wherein the mobile telecommunication network being the UMTS network and the interface being the Iub interface of the network.

10. The radio link establishment method according to claim 9, wherein forming the request message includes forming the request message with ALCAP protocol messages that are AAL2 connection request messages.

11. The radio link establishment method according to claim 9, wherein forming the response message includes forming the response message with ALCAP protocol messages that are AAL2 connection confirmation messages.

12. A method of establishing a radio link at the interface between a base station and an access network controller in a mobile telecommunication network, comprising:
    forming a request message for establishing the link by concatenating a message of the radio link control protocol and a plurality of messages of the transport control protocol;
    transmitting the request message by the access controller to the base station;
    forming a response message by concatenating a message of the radio link control protocol and a plurality of messages of the transport control protocol; and
    receiving the response message sent back by the station.

13. The radio link establishment method according to claim 12, wherein forming the request message includes forming the request message with the number of messages of the transport control protocol.

14. The radio link establishment method according to claim 12, wherein the mobile telecommunication network being the UMTS network and the interface being the Iub interface of the network, the radio link control protocol is the NBAP protocol and the transport control protocol is the ALCAP protocol.

15. The radio link establishment method according to claim 14, wherein forming the request message includes forming the request message with ALCAP protocol messages that are AAL2 connection request messages.

16. The radio link establishment method according to claim 14, wherein forming the response message includes forming the response message with ALCAP protocol messages that are AAL2 connection confirmation messages.

\* \* \* \* \*